(12) United States Patent
Miyata (10) Patent No.: US 10,928,596 B2
(45) Date of Patent: Feb. 23, 2021

(54) LIGHT SOURCE DEVICE AND METHOD FOR MANUFACTURING THE SAME

(71) Applicant: Nichia Corporation, Anan (JP)

(72) Inventor: Tadaaki Miyata, Yokohama (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/582,170

(22) Filed: Sep. 25, 2019

(65) Prior Publication Data

US 2020/0096712 A1 Mar. 26, 2020

(30) Foreign Application Priority Data

Sep. 26, 2018 (JP) .............................. JP2018-180796

(51) Int. Cl.
  *G02B 6/42* (2006.01)
  *G03B 21/20* (2006.01)
  *G02B 27/09* (2006.01)

(52) U.S. Cl.
  CPC ....... *G02B 6/4206* (2013.01); *G02B 27/0955* (2013.01); *G03B 21/2033* (2013.01)

(58) Field of Classification Search
  CPC .......... H01S 3/101; H01S 3/23; H01S 3/0071; H01S 5/022; H01S 5/02208; H01S 5/02288; H01S 5/02292; G02B 6/4206; G02B 27/0955; G02B 21/2033
  See application file for complete search history.

(56) References Cited

U.S. PATENT DOCUMENTS

2011/0170831 A1   7/2011   Tamura
2018/0195677 A1   7/2018   Konagayoshi et al.

FOREIGN PATENT DOCUMENTS

| JP | 02-021768 U1 | 2/1990 |
| JP | 10-075015 A | 3/1998 |
| JP | 2011-142265 A | 7/2011 |
| JP | 2013-219232 A | 10/2013 |
| JP | 2017-059716 A | 3/2017 |
| JP | 2017-138566 A | 8/2017 |

*Primary Examiner* — Armando Rodriguez
(74) *Attorney, Agent, or Firm* — Birch, Stewart, Kolasch & Birch, LLP (57) ABSTRACT

A light source device includes: a package having an upward-facing surface and a surrounding inner lateral surface, a recess being defined by the upward-facing and inner lateral surfaces; a laser light source disposed on the upward-facing surface of the package; a cover closing the recess; a reflecting surface reflecting light emitted from the laser light source; and first and second lenses disposed on inner and outer surface sides of the cover, respectively, in an optical path region of the reflected light. One of the first and second lenses has a greater curvature in a major axis direction of a far field pattern of light emitted from the laser light source than in a minor axis direction of the far field pattern. The other of the first and second lenses has a greater curvature in the minor axis direction of the far field pattern than in the major axis direction.

20 Claims, 8 Drawing Sheets

Emitted light

Reflecting light

LIGHT SOURCE DEVICE AND METHOD FOR MANUFACTURING THE SAME

CROSS-REFERENCE TO RELATED APPLICATION

This application claims priority under 35 U.S.C. § 119(a) to Japanese Patent Application No. 2018-180796, filed on Sep. 26, 2018, the contents of which are hereby incorporated by reference in their entirety.

BACKGROUND

1. Technical Field

The present disclosure relates to a light source device and a method of manufacturing the same.

2. Description of Related Art

A light source device including a laser light source and an optical member configured to collimate diffused light emitted from a laser light source into parallel light in the major axis direction and the minor axis direction of the far field pattern of the light is proposed (for example, see JP 2013-219232 A).

SUMMARY

In a light source device described in JP 2013-219232 A, a plurality of optical members needs to be arranged spaced apart from each other in the light source device. Accordingly, reduction in size of such a light source device may be difficult. When the distance between adjacent ones of the plurality of optical members is reduced to be in a predetermined range so as to downsize the light source device, the aspect ratio between the major axis direction and the minor axis direction of light emitted from the light source device may not be a desired value.

An object of the present disclosure is to provide a downsized light source device configured to emit light with a desired aspect ratio between the major axis direction and the minor axis direction of a far field pattern of light emitted from a laser light source.

A light source device according to one embodiment of the present disclosure includes: a package having an upward-facing surface and an inner lateral surface surrounding the upward-facing surface, the package defining a recess defined by the upward-facing surface and the inner lateral surface; a laser light source disposed on the upward-facing surface of the package; a cover disposed above the package such that the cover closes the recess; a reflecting surface reflecting, toward the cover, light emitted from the laser light source; a first lens disposed in an optical path region of light reflected at the reflecting surface and on an inner surface side of the cover; and a second lens disposed in the optical path region of the light reflected at the reflecting surface and on an outer surface side of the cover. One of the first lens and the second lens has a greater curvature in a major axis direction of a far field pattern of light emitted from the laser light source than a curvature in a minor axis direction of the far field pattern. The other one of the first lens and the second lens has a greater curvature in the minor axis direction of the far field pattern of the light emitted from the laser light source than a curvature in the major axis direction of the far field pattern.

According to certain embodiments of the present disclosure with configurations described above, a downsized light source device is configured to emit light with a desired aspect ratio between the major axis direction and the minor axis direction of a far field pattern of light emitted from a laser light source.

DETAILED DESCRIPTION OF EMBODIMENTS

Certain embodiments and examples of the present disclosure will be described below with reference to the drawings. The light source device described below is intended to give a concrete form to the technical idea of the present invention, and does not limit the scope of the present invention to the description below unless otherwise specified.

In the drawings, members having an identical function may be denoted by an identical reference character. For describing the gist and for ease of understanding, a plurality of embodiments and examples will be described below.

Configurations described in different embodiments or examples may be partially interchanged or combined. Configurations that are the same in a plurality of embodiments or examples may not be repetitively described, and configurations different from those in other embodiments or examples may be described. In particular, the operation and effect which are attained by the similar configuration will not be repeated every embodiment or example. In the drawings, the size or positional relationship among members may be exaggerated for the sake of clarity.

First Embodiment

With reference to FIGS. 1, 2A to 2E, a light source device according to a first embodiment of the present disclosure will be described below.

Figure 1:
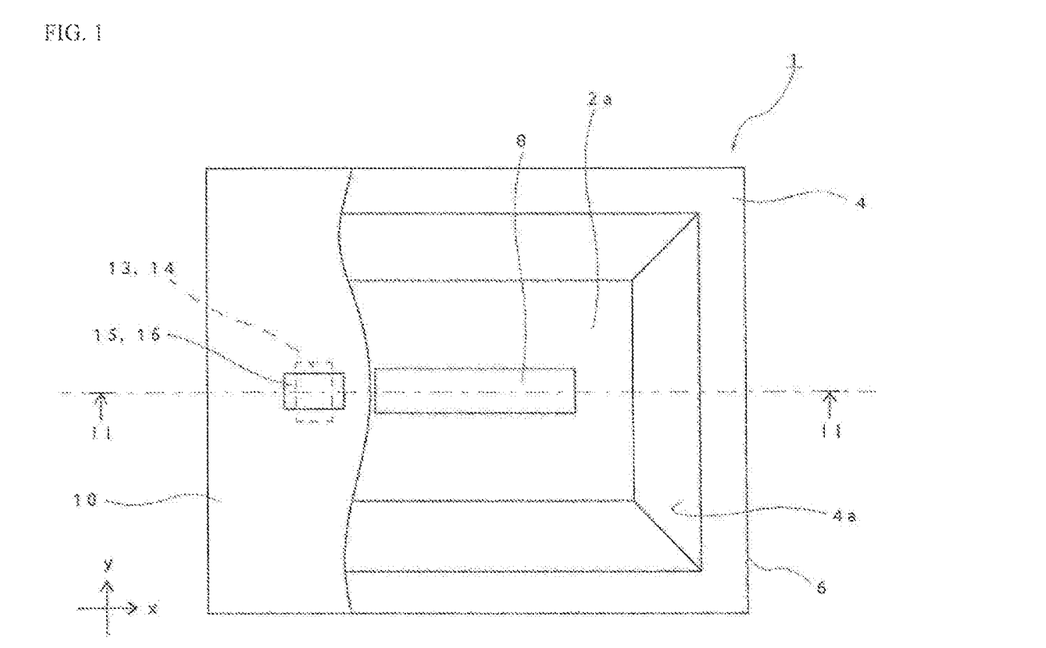
FIG. 1 is a schematic top view of a light source device according to a first embodiment.
Figure 2A:
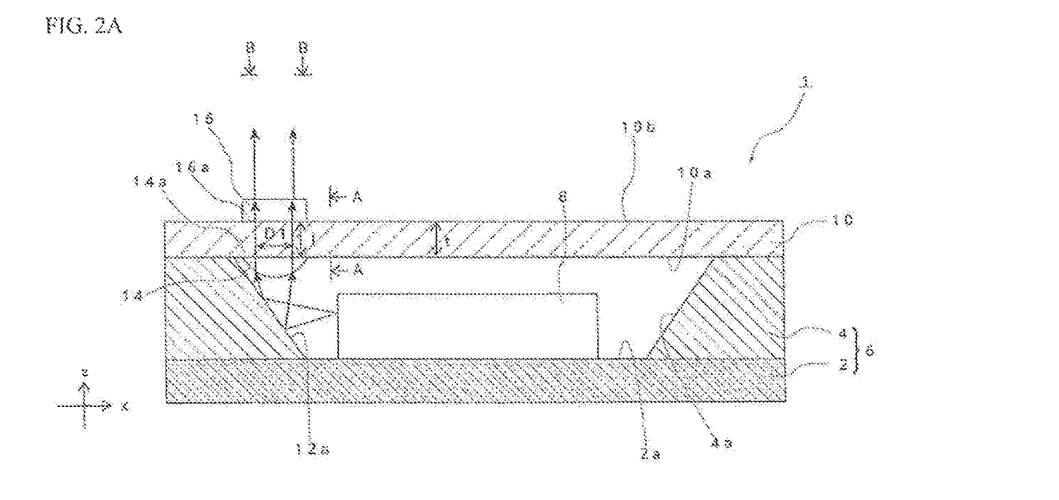
FIG. 2A is a cross-sectional view taken along line II-II in FIG. 1.
Figure 2B:
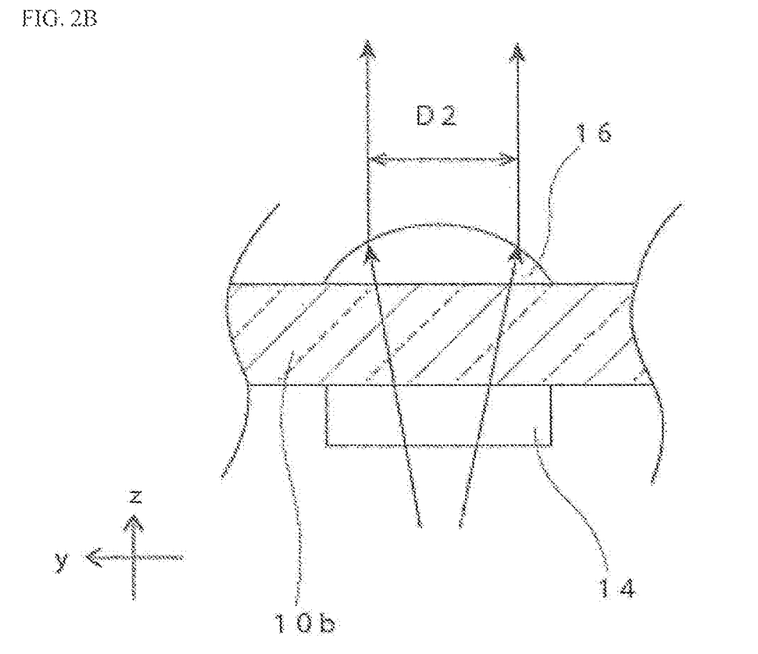
FIG. 2B is a schematic cross-sectional view of a cover, a first lens, and a second lens taken along line A-A when the light source device is seen in a direction indicated by the arrows.
Figure 2C:
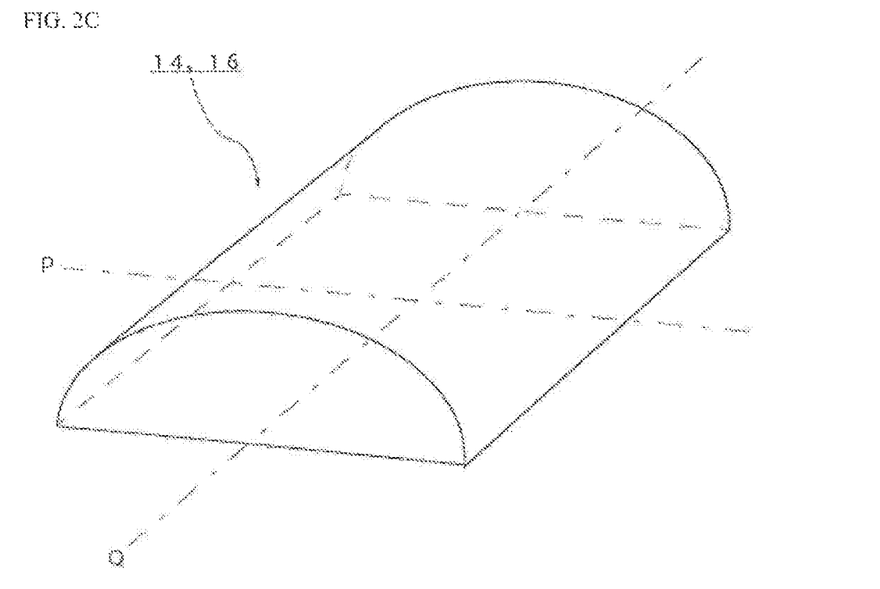
FIG. 2C is a schematic perspective view of a lens included in the light source device according to the first embodiment.
Figure 2D:
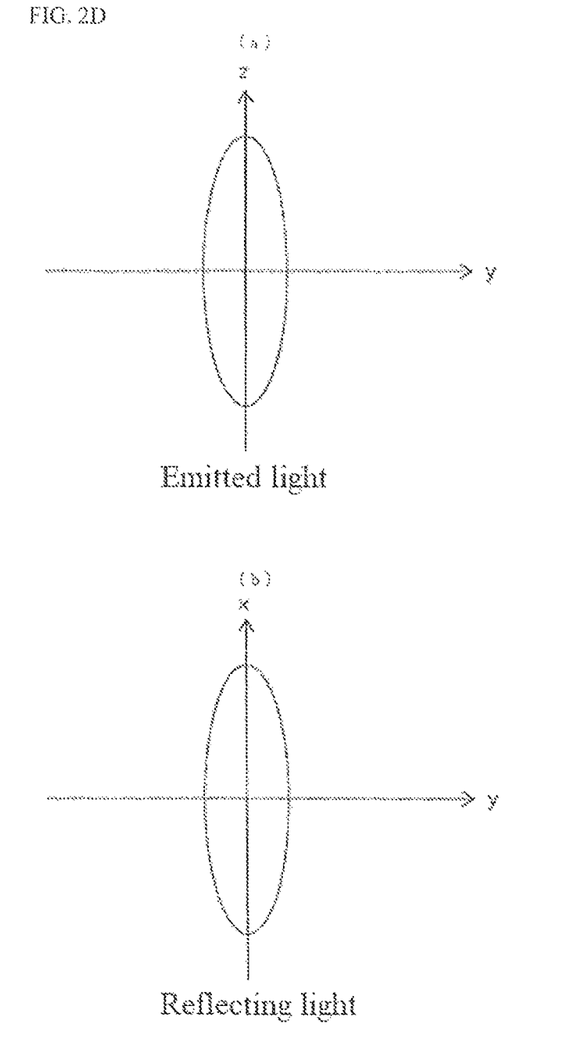
FIG. 2D schematically shows, in (a), the major axis and the minor axis of the far field pattern of light emitted from the laser light source in FIG. 2A, and in (b), the major axis and the minor axis of reflecting light.
Figure 2E:
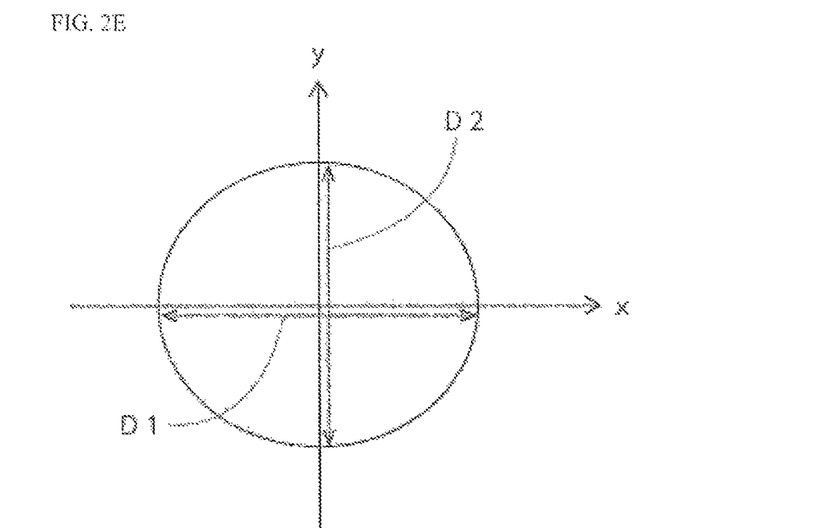
FIG. 2E schematically shows the pattern of light emitted from the light source device in FIG. 2A when seen at a position indicated by line B-B in a direction indicated by arrows.

FIG. 1 is a top view of the light source device according to the first embodiment. FIG. 2A is a cross-sectional view taken along line II-II in FIG. 1. FIG. 2B is a schematic cross-sectional view of a cover, a first lens, and a second lens taken along line A-A when the light source device in FIG. 2A is seen in a direction indicated by arrows. FIG. 2C is a schematic perspective view of a lens included in the light source device according to the first embodiment of the present disclosure. FIG. 2D schematically shows, in (a), the major axis and the minor axis of the far field pattern of light emitted from a laser light source, and in (b), the major axis and the minor axis of reflected light. FIG. 2E schematically shows the pattern of light emitted from the light source device in FIG. 2A when seen at a position indicated by line B-B in a direction indicated by arrows.

As shown in FIGS. 1 and 2A, the light source device 1 according to the first embodiment includes a package 6, which defines a recess defined by an upward-facing surface 2a, which is the upper surface of a substrate 2, and an inner lateral surface 4a of a lateral wall member 4. A cover 10 is disposed above the package 6 such that the cover 10 closes the recess. A laser light source 8 is disposed on the upward-facing surface 2a. The lateral wall member 4 of the package has a reflecting surface 12a, at which light emitted from the laser light source 8 is reflected toward the cover 10. A first lens 13 is disposed on the inner surface 10a side of the cover 10. A second lens 15 is disposed on the outer surface 10b side of the cover 10. The first lens 13 and the second lens 15 are disposed in the optical path region of light reflected at the reflecting surface 12a.

In FIGS. 1 to 5, in a plan view, a direction in which light is emitted from the laser light source 8 is referred to as an "x-axis direction", and a direction perpendicular to the x-direction is referred to as a "y-axis direction". In a side vie a height direction is referred to as a z-axis direction. The major axis direction of the far field pattern of light emitted from the laser light source 8 corresponds to the z-axis direction, and the minor axis direction thereof corresponds to the y-axis direction. The major axis direction and the minor axis direction of the far field pattern of the light reflected at the reflecting surface 12a corresponds to the x-axis direction and the y-axis direction, respectively.

Substrate and Lateral Wall Member

In the first embodiment, the substrate 2 and the lateral wall member 4 are made of different materials. Accordingly, a material suitable for a respective intended use may be employed for each of the substrate 2 and the lateral wall member 4. In the present embodiment, aluminum nitride is used for a material of the substrate 2. For the substrate 2, other appropriate materials may be used, and other ceramic material such as alumina, alumina zirconia, or silicon nitride, a resin material, monocrystalline of silicon or the like, a metal material, or a combination of these materials may be used. These materials may be used in combination with an insulating layer. In the present embodiment, silicon may be used for a material of the lateral wall member 4. When the lateral wall member 4 is made of silicon, a reflecting surface with an accurate inclination angle is obtained. For example, by etching the (100) plane of monocrystalline silicon using an anisotropy etching technique, the (111) plane having an angle of 54.7° is exposed, which serves as the inner lateral surface 4a.

Bonding Substrate and Lateral Wall Member

The substrate 2 and the lateral wall member 4 are connected to each other via a bonding film (not shown). The bonding film has, for example, a layered structure consisting of different metal films. For example, in order to bond the substrate 2 and the lateral wall member 4 to each other, a bonding film is disposed on a mounting region, on which the lateral wall member 4 is mounted, of the upward-facing surface 2a, which is the upper surface of the substrate 2, such that the bonding film consists of: a base layer including a first layer formed of a film containing titanium (Ti), nickel (Ni), platinum (Pt), palladium (Pd), or chromium (Cr) and optionally including a second layer formed of a film containing platinum (Pt) and a third layer (a bonding layer) formed of a film containing gold (Au) and layered on the base layer. The bonding film may have any appropriate number of layers, and may have two layers or four or more layers. The uppermost layer of the bonding film is preferably made of gold (Au).

A bonding film is disposed also on a lower surface of the lateral wall member 4, such that the bonding film consists of: a base layer including a first layer formed of a film containing titanium (Ti), nickel (Ni), platinum (Pt), palladium (Pd), or chromium (Cr), and optionally including a second layer formed of a film containing platinum (Pt); and a third layer (a bonding layer) formed of a film containing gold (Au) and layered on the base layer. The bonding film may have any appropriate number of layers, and may have two layers or four or more layers. The uppermost layer of the bonding film is preferably made of gold (Au).

The bonding film may have a thickness in a range of about 0.3 μm to 2 μm.

The bonding film located at a substrate 2 side and the bonding film located at a lateral wall member 4 side are fuse-bonded with a metal bonding member (e.g., lead-free solder) made of tin (Sn), silver (Ag), and copper (Cu). Thus, the substrate 2 and the lateral wall member 4 are bonded hermetically and securely. For the metal bonding member, gold-tin alloy (AuSn) or other solder material may be used.

Reflecting Surface

The reflecting surface 12a reflects light emitted from the laser light source 8 toward the cover 10. The expression "light reflected toward the cover 10" refers to reflected light that propagates toward the cover 10 in any appropriate direction including a vertical upward vector component.

The reflecting surface 12a may be the inner lateral surface 4a of the lateral wall member 4. The reflecting surface 12a is preferably the outer surface of a reflecting film (not shown) formed at the inner lateral surface 4a. The reflecting film consists of, for example: a base layer including a first layer formed of a film containing titanium (Ti), nickel (Ni), platinum (Pt), palladium (Pd), or chromium (Cr), and optionally including a second layer containing platinum (Pt); and a third layer (reflecting layer) formed of a film containing silver (Ag) and layered on the base layer. The reflecting film may have a thickness in a range of about 0.3 μm to 2

μm. The reflecting film may have any appropriate number of layers, and may have two layers or four or more layers. The uppermost layer of the reflecting film is preferably made of silver (Ag).

In the present embodiment, a film containing silver is formed as the reflecting film, so that the reflecting surface 12a has a high reflectance. The third layer forming the reflecting surface may not be a film containing silver (Ag), and may be a metal film containing aluminum (Al), for example.

A dielectric film (not shown) made of silicon dioxide ($SiO_2$) or titanium dioxide ($TiO_2$) is disposed on the reflecting surface 12a of the reflecting film. The dielectric film may be a single layer, or may be a multilayer film in which layers of different refractive index are layered. With appropriate material and thickness of the layers, the dielectric film can function as a good reflecting film, or as a good anti-reflection film (which may be also referred to as a non-reflecting film). In the present embodiment, using the dielectric film functioning as a reflecting film allows for effectively increasing the reflectance of the reflecting surface.

When forming the dielectric film at the reflecting surface, generally, the region where the dielectric film is not to be formed is masked by printing or the like, and the dielectric film is formed using sputtering or vapor deposition. Further, for example, by wet-etching a portion of the formed dielectric film, the dielectric film may be shaped into a desired pattern.

In place of forming the reflecting film at the inner lateral surface 4a of the lateral wall member 4, an individual reflective mirror may be disposed. Any known appropriate material such as glass, monocrystalline or polycrystalline silicon, a ceramic material, a resin material or the like may be used for the individual reflective minor.

In the present embodiment, while the four surfaces of the lateral wall member 4 may function as the reflecting surface, the surfaces other than the one which reflects light from the laser light source 8 may not be provided with the reflecting film. Rather, such surfaces may be provided with an anti-reflection film or the like.

Laser Light Source

The light source device 1 according to the first embodiment includes a single laser light source 8, and a laser diode is used as the laser light source 8. For the laser diode, a nitride semiconductor laser element configured to emit light in an ultraviolet to green wavelength region, or a GaAs-based semiconductor laser element configured to emit light in a red to infrared wavelength region may be used. Thus, the light source device 1 with high luminance and high color reproductivity can be obtained.

Cover

In the first embodiment, light-transmissive glass is used for the light-transmissive cover 10. For the light-transmissive cover 10, any other appropriate material may be used, and quartz, sapphire or the like may be used. That is, a material that transmits the wavelength of light emitted from the laser light source 8 may be used.

Bonding Lateral Wall Member and Cover

Next, bonding the upper surface of the lateral wall member 4 and the inner surface 10a of the cover 10 will be described.

In the first embodiment, at the region in the upper surface of the lateral wall member 4 where the dielectric film is not formed, a connecting member (not shown) made of aluminum or aluminum alloy is formed using sputtering or vapor deposition. The upper surface of the formed connecting member and the inner surface 10a of the cover 10 are anodic-bonded to each other.

Anodic bonding is a technique in which glass and metal, or glass and silicon are brought into contact with each other and heated while applying a predetermined voltage with the metal side set as the anode, to perform bonding. The anodic bonding can bond materials with different characteristics, such as glass and metal, or glass and silicon, without any other member such as solder or an adhesive agent between the materials to be bonded together. Instead of aluminum or aluminum alloy, titanium, titanium alloy, or silicon may be used for a material of the connecting member in anodic bonding. Glass is suitably alkali glass.

Thus, bonding the connecting member and the cover 10 using anodic bonding allows highly hermetic and secure connection.

Lenses

In the first embodiment, each of the first lens 13 and the second lens 15 is a cylindrical lens as shown in FIG. 2C, and are configured to collimate the reflected light of the laser light source 8 reflected at the reflecting surface 12a.

The first cylindrical lens 14 and the second cylindrical lens 16 are light transmissive. In the present embodiment, the first cylindrical lens 14 and the second cylindrical lens 16 are made of light-transmissive glass. Any other appropriate materials may be used for the first cylindrical lens 14 and the second cylindrical lens 16, and quartz, sapphire or the like may be used may be used for the first cylindrical lens 14 and the second cylindrical lens 16. Further, with the second cylindrical lens 16 disposed outside the package 6, the laser light source 8 is less likely to be influenced by outgassing or the like of resin. Therefore, for example, the first cylindrical lens 14 and the second cylindrical lens 16 may be made of light-transmissive resin.

When the cover 10, the first cylindrical lens 14, and the second cylindrical lens 16 are made of an identical material (for example, glass), the cover 10, the first cylindrical lens 14, and the second cylindrical lens 16 may be integrally molded. Alternatively, the cover 10, the first cylindrical lens 14, and the second cylindrical lens 16 may not be integrally molded. For example, when the cover 10, the first cylindrical lens 14, and the second cylindrical lens 16 are formed as separate members, the cover 10 and the first cylindrical lens 14 and the second cylindrical lens 16 are bonded such that optical loss at the bonding surface are reduced. For example, the first cylindrical lens 14 and the second cylindrical lens 16 may be bonded to the cover 10 using the periphery of each lens at which light is not transmitted.

With reference to FIGS. 2A to 2E, arrangement of the first cylindrical lens 14 and the second cylindrical lens 16 will be described below Arrangement of Lenses As has been described above, the first cylindrical lens 14 and the second cylindrical lens 16 are disposed in the optical path region of light reflected at the reflecting surface 12a.

The first cylindrical lens 14 is disposed on the inner surface 10a side of the cover 10 such that a first axis P of the first cylindrical lens 14 with a curvature extends in the x-axis direction, and a second axis Q of the first cylindrical lens 14 without a curvature extends in the y-axis direction. On the other hand, the second cylindrical lens 16 is disposed on the outer surface 10b side of the cover 10 such that a first axis P of the second cylindrical lens 16 extends in the y-axis direction, and has a second axis Q of the second cylindrical lens 16 extends in the x-axis direction.

Thus, the direction of the first axis P of the first cylindrical lens 14 corresponds to the major axis direction (the x-axis direction in (b) of FIG. 2D) of light emitted from the laser light source 8 and reflected at the reflecting surface 12a. On the other hand, the direction of the first axis P of the second cylindrical lens 16 corresponds to the minor axis direction (the y-axis direction in (b) of FIG. 2D) of light emitted from the laser light source 8 and reflected at the reflecting surface 12a.

In the light source device 1 having structure as described above, the major axis direction (the x-axis direction in (b) of FIG. 2D) of light emitted from the laser light source 8 and reflected at the reflecting surface 12a is collimated by the first cylindrical lens 14. A light collimated by the first cylindrical lens 14 in the major axis direction of the light passes through the cover 10 while maintaining the width of the major axis direction at a width D1 (see FIG. 2A). On the other hand, in the minor axis direction (the y-axis direction in (b) of FIG. 2D) of the light, the light passing through the cover 10 continuously spreads at a spreading angle which is substantially identical to that of the light before entering the first cylindrical lens 14 (see FIG. 2B). The light having passed through the cover 10, which has a thickness t, is incident on the second cylindrical lens 16 where the light has its minor axis direction collimated to have a width D2 by the second cylindrical lens 16. Accordingly, light is collimated into a parallel light (collimated light) having the width D1 in the major axis direction and the width D2 in the minor axis direction, and emitted from the light source device 1 (see FIG. 2E).

Thus, the light emitted from the light source device 1 is collimated light. Therefore, irrespective of the distance between the light source device 1 and the target illumination region, a certain range in the target illumination region is illuminated.

When the thickness t of the cover 10 is increased, an optical distance 1 between the bottom surface 14a of the first cylindrical lens 14 and the bottom surface 16a of the second cylindrical lens 16 is increased and, therefore, the spreading width of the light in the minor axis direction is increased. On the other hand, when the thickness t of the cover 10 is reduced, the optical distance 1 between the bottom surface 14a of the first cylindrical lens 14 and the bottom surface 16a of the second cylindrical lens 16 is reduced and, therefore, the spreading width of the light in the minor axis direction is reduced. That is, the thickness t of the cover 10 determines the spreading width of the light in the minor axis direction and, therefore, the width D2 in the minor axis direction of the light emitted from the light source device 1 is determined by a thickness t of the cover 10. Accordingly, adjusting the thickness t of the cover 10 allows for obtaining a desired aspect ratio D1/D2 between the major axis direction and the minor axis direction of the light emitted from the light source device 1. Not only the thickness t, but also a refractive index n is considered to adjust optical distance.

In a conventional technique, a plurality of lenses needs to be arranged spaced apart from each other in a light source device, so that reduction in size of the light source device may be difficult. However, according to the present embodiment, a downsized light source device 1 configured to emit light of a desired aspect ratio between the major axis direction and the minor axis direction of the far field pattern of light emitted from the laser light source 8 can be obtained.

Further, with the cover 10 having an appropriate refractive index n and an appropriate thickness t, the aspect ratio D1/D2 between the major axis direction and the minor axis direction of light emitted from the light source device 1 becomes a value of one, so that the light source device 1 can emit a circular beam.

Second Embodiment

Figure 3:
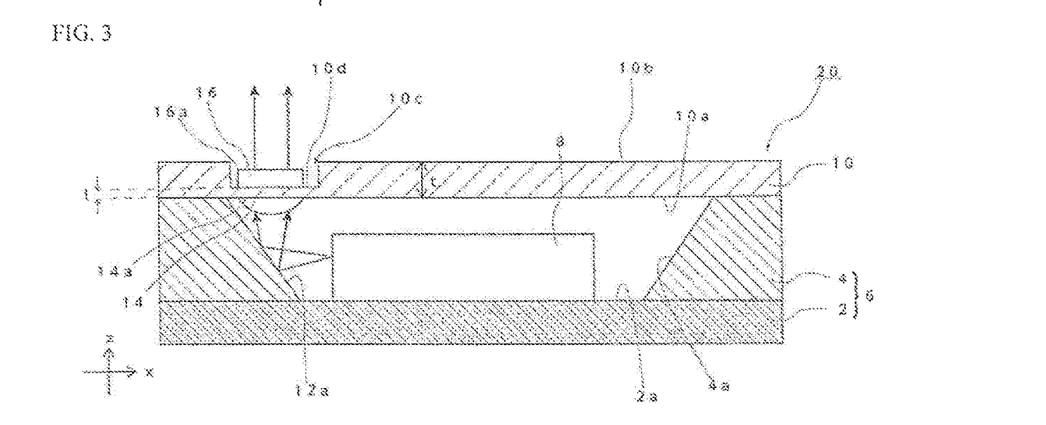
FIG. 3 is a schematic cross-sectional view of a light source device according to a second embodiment.

Next, with reference to FIG. 3, a light source device 20 according to a second embodiment of the present disclosure will be described below.

The light source device 20 according to the second embodiment is different from the first embodiment in that the bottom surface 16a of the second cylindrical lens 16 is located in a recess 10c defined at the outer surface 10b side of the cover 10.

More specifically, the second cylindrical lens 16 is disposed such that the bottom surface 16a is in contact with a flat bottom surface 10d of the recess 10c.

The recess 10c may be formed by, for example, flowing a melted glass material into a mold corresponding to the shape of the recess and performing cooling. Alternatively, the recess may be formed using laser abrasion or the like.

This configuration allows the optical distance 1 between the bottom surface 14a of the first cylindrical lens 14 and the bottom surface 16a of the second cylindrical lens 16 to be smaller than the thickness t of the cover 10. Accordingly, while the cover 10 may have a certain thickness that is required in consideration of endurance, design condition and the like, the optical distance 1 between the bottom surface 14a of the first cylindrical lens 14 and the bottom surface 16a of the second cylindrical lens 16 can be reduced. Accordingly, compared to the first embodiment, the spreading width in the minor axis direction of light transmitting through the cover 10 can be reduced, and the width D2 in the minor axis direction of light emitted from the light source device 1 can be reduced.

With the light source device 20 having such a structure, a desired aspect ratio D1/D2 between the major axis direction and the minor axis direction of light emitted from the light source device 20 can be obtained, irrespective of the required thickness of the cover 10. As can be seen from the description above, the light source device 20 according to the second embodiment is suitable for emitting light with oval-shaped cross-section which is longer in its major axis direction than its minor axis direction.

Third Embodiment

Figure 4:
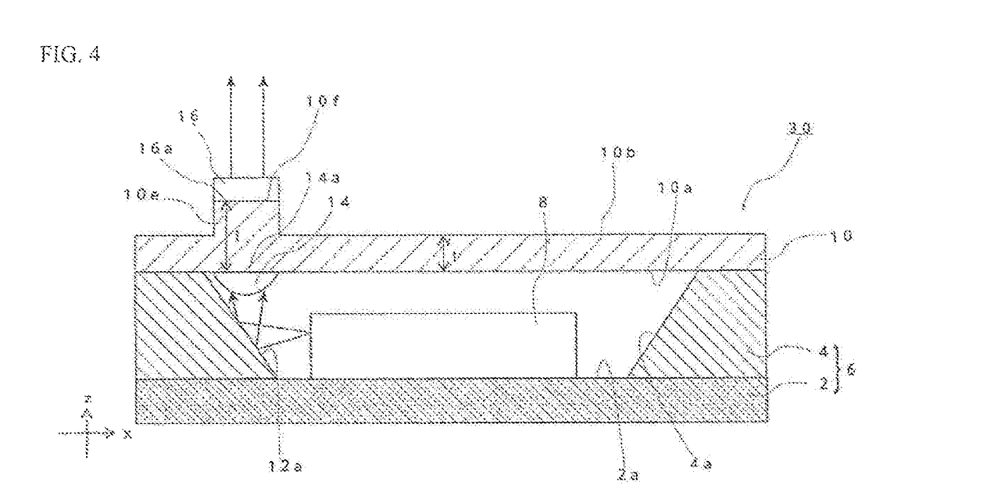
FIG. 4 is a schematic cross-sectional view of a light source device according to a third embodiment.

Next, with reference to FIG. 4, a light source device 30 according to a third embodiment of the present disclosure will be described below.

The light source device 30 according to the third embodiment is different from the first embodiment in that the bottom surface 16a of the second cylindrical lens 16 is disposed on a projection 10e located on the outer surface 10b side of the cover 10.

More specifically, the second cylindrical lens 16 is disposed so that the bottom surface 16a is in contact with a flat upper surface 10f of the projection.

The cover having the projection 10e may be formed by, for example, flowing a melted glass material into a mold corresponding to the shape of the projection and performing cooling. Alternatively, the cover with the projection 10e may be formed by, for example, removing an unnecessary portion in the surface of a plate-like cover using laser abrasion or the like. Alternatively, a portion to serve as the projection may be bonded to a surface of the cover. In the case of bonding a projection, a projection that has been formed may be bonded, or a projection may be formed directly on a surface of the cover using a 3D printer or the like.

This configuration allows the optical distance 1 between the bottom surface 14a of the first cylindrical lens 14 and the bottom surface 16a of the second cylindrical lens 16 to be greater than the thickness t of the cover 10. Thus, without increasing the thickness of the cover 10 as a whole, the optical distance 1 can be increased. Accordingly, compared to the first embodiment, the spreading width in the minor axis direction of light transmitting through the cover 10 can also be increased, and the width D2 in the minor axis direction of light emitted from the light source device 1 can be increased.

With the light source device 30 having such a structure, a desired aspect ratio D1/D2 between the major axis direction and the minor axis direction of light emitted from the light source device 30 can be obtained irrespective of a thickness t of the cover 10. As can be seen from the description above, the light source device 30 according to the third embodiment can emit light with oval-shaped cross-section having a length smaller in a major axis direction than a length in a minor axis direction.

Fourth Embodiment

Figure 5:
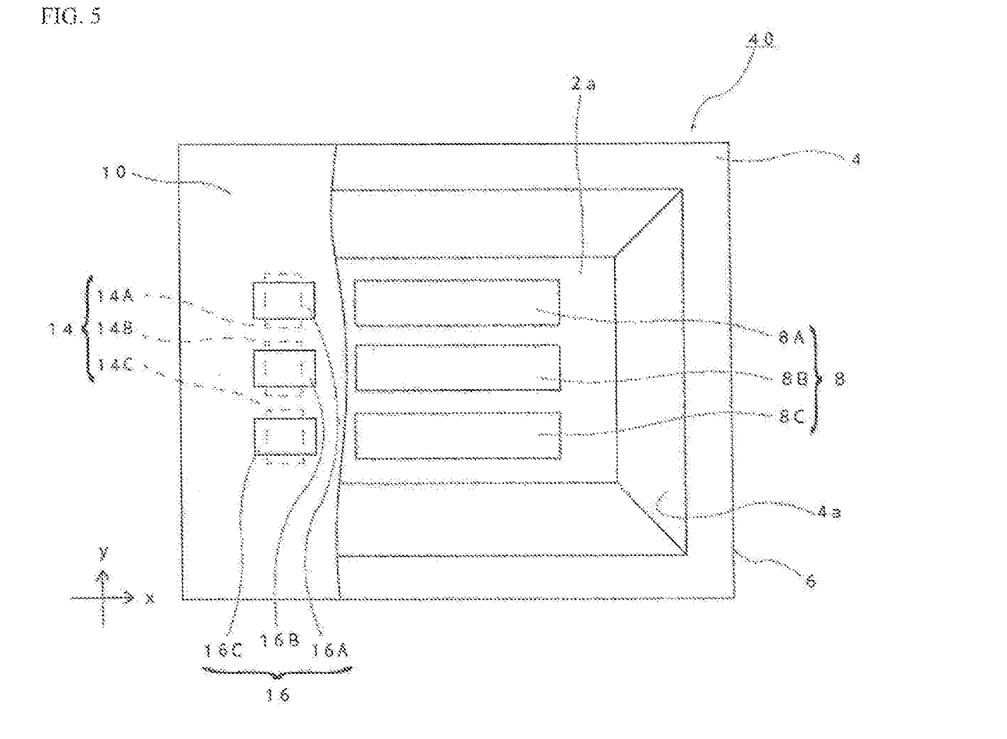
FIG. 5 is a schematic plan view of a light source device according to a fourth embodiment.

Next, with reference to FIG. 5, a light source device 40 according to a fourth embodiment of the present disclosure will be described below. The light source device 40 according to the fourth embodiment is different from the first embodiment in including three laser light sources 8, and three first cylindrical lenses 14 and three second cylindrical lenses 16 provided to correspond respectively to the three laser light sources 8. In the fourth embodiment, the three laser light sources 8 consist of a first laser light source 8A configured to emit light of a red wavelength region, a second laser light source 8B configured to emit light of a green wavelength region, and a third laser light source 8C configured to emit light of a blue wavelength region.

The three laser light sources 8A to 8C are disposed on the upward-facing surface 2a, which is the upper surface of the substrate 2, such that a light emitting surface of each of the three laser light sources 8A to 8C is oriented in the same direction. As in the first embodiment, light beams emitted from the three laser light sources 8A to 8C are reflected at the reflecting surface 12a substantially vertically upward relative to the substrate 2. Each of the reflected light beams is incident on a respective one of the first cylindrical lenses 14A to 14C provided to correspond to the laser light sources 8A to 8C, respectively, where the light beams spreading in the major axis direction are collimated. After passing through the cover 10, the light beams spreading in the minor axis direction are collimated by the second cylindrical lens 16A to 16C.

The laser light sources 8A to 8C are laser light sources different from one another, and are configured to emit light in different wavelength regions and at different spreading angles. Accordingly, the first cylindrical lenses 14A to 14C have different curvatures such that each of the first cylindrical lenses 14A to 14C has a curvature corresponding to a wavelength region and a spreading angle of a respective one of the laser light sources 8A to 8C, and the second cylindrical lens 16A to 16C have different curvatures such that each of the second cylindrical lens 16A to 16C has a curvature corresponding to a wavelength region and a spreading angle of a respective one of the laser light sources 8A to 8C.

Thus, the light source device 40 can emit light collimated for each wavelength region. The light source device 40 includes the laser light sources 8A to 8C configured to emit light of red, green, and blue wavelength regions, respectively. Therefore, for example using a multiplexer, the light source device 40 can emit white light, which is a mixture of light of the color wavelength regions described above. Furthermore, as in the first embodiment, adjustment of a thickness t of the cover 10 allows for obtaining a desired aspect ratio D1/D2 between the major axis direction and the minor axis direction of the white light.

In the fourth embodiment, while the light source device including three laser light sources different from one another in wavelength region has been described, any other number of laser light sources may be employed in the light source device 40. The plurality of laser light sources may have wavelength regions entirely different from one another, or may have the same wavelength region, or some of the plurality of laser light sources may have different wavelength regions.

The laser light sources may be varied from one another in the thickness of the cover 10 or the distance between the laser light source and the first cylindrical lens surface in each laser light sources may be different between the laser light sources, so that collimated light beams of the same aspect ratio or of the same beam diameter can be obtained despite the difference in wavelength region and spreading angle among the laser light sources.

The configuration of the fourth embodiment including a plurality of laser light sources, a plurality of first lenses, and a plurality of second lenses is also applicable to the second and third embodiments. Also in this case, similarly to the effect in the second and third embodiments, white light of a desired aspect ratio D1/D2 can be extracted from the light source device irrespective of the thickness t of the cover 10.

As described above, the light source device 1, 20, 30, 40 according to the first to fourth embodiments includes: a package 6 including a recess defined by an upward-facing surface 2a and an inner lateral surface 4a surrounding the upward-facing surface 2a; a laser light source 8, 8A to 8C disposed at the upward-facing surface 2a; a cover 10 disposed above the package 6 such that the cover 10 closes the recess; a reflecting surface 12a reflecting, toward the cover 10, light emitted from the laser light source 8, 8A to 8C; a first lens 13 disposed in an optical path region of light reflected at the reflecting surface 12a and on the inner surface 10a side of the cover 10; and a second lens 15 disposed in an optical path region of light reflected at the reflecting surface 12a and on the outer surface 10b side of the cover 10. One of the first lens 13 and the second lens 15 has a greater curvature in a major axis direction of a far field pattern of light emitted from the laser light source 8, 8A to 8C than a curvature in a minor axis direction of the far field pattern of light emitted from the laser light source 8, 8A to 8C. The other of the first lens 13 and the second lens 15 has a greater curvature in the minor axis direction of the far field pattern of light emitted from the laser light source 8, 8A to 8C than a curvature in the major axis direction of the far field pattern of light emitted from the laser light source 8, 8A to 8C.

This allows for downsizing the light source device 1, 20, 30, 40 configured to emit light of a desired aspect ratio between the major axis direction and the minor axis direction of the far field pattern of light emitted from the laser light source 8, 8A to 8C.

Other Embodiments

In the above-described embodiments, light is collimated into parallel light by the lenses. Alternatively, the lenses may be used to diffuse or condense light. In the case of using the lenses to diffuse or condense light, light may become parallel in one of the major axis direction and the minor axis direction of light emitted from the light source device, and become diffused or converged in other one of the major axis direction and the minor axis direction of light emitted from the light source device.

That is, while the cylindrical lenses each having a curvature in one of the major axis direction and the minor axis direction of the lens are employed in the first to fourth embodiments described above, a lens having a curvature in both of the major axis direction and the minor axis direction of the lens may be used. When using a lens having a curvature in both of the major axis direction and the minor axis direction of the lens, one of the first lens 13 and the second lens 15 has a curvature in the major axis direction greater than the curvature in the minor axis direction, and the other of the first lens 13 and the second lens 15 has a curvature in the minor axis direction greater than the curvature in the major axis direction. More specifically, an oval convex lens, an oval concave lens or the like is desirable. Variant examples of such a lens will be described below.

Variant Examples of Lenses

Figure 6A:
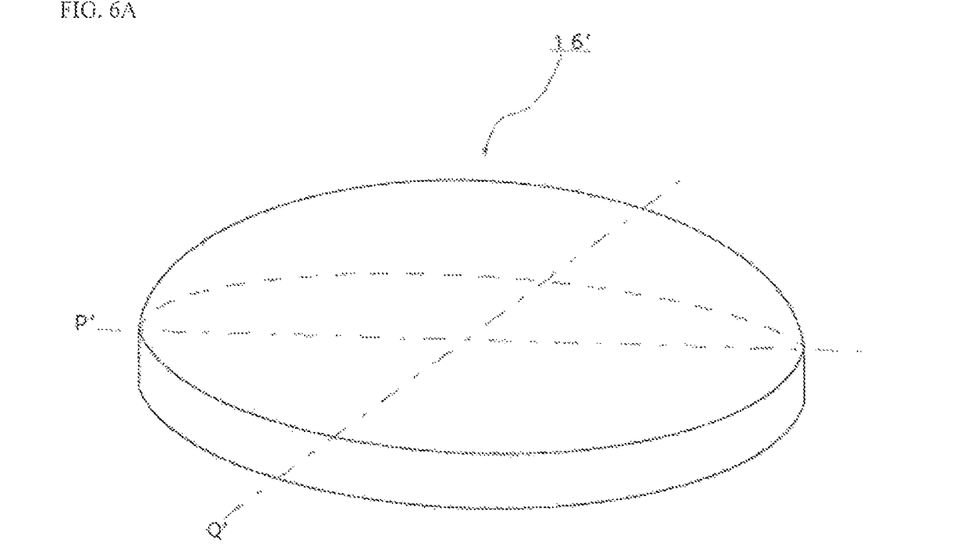
FIG. 6A is a schematic perspective view of an oval convex lens which is a variant example of the lens according to certain embodiments.
Figure 6B:
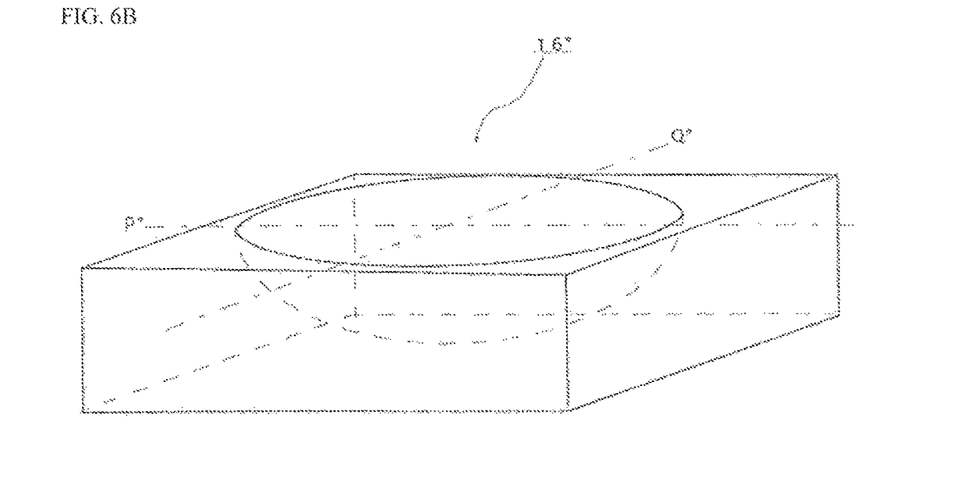
FIG. 6B is a schematic perspective view of an oval concave lens which is a variation of the lens according to certain embodiments.

FIG. 6A is a schematic perspective view of an oval convex lens 16, which is a variant example of the lens in the present disclosure. FIG. 6B is a schematic perspective view of an oval concave lens 16'', which is a variant example of the lens in the present disclosure. Light having passed through a convex lens is converged, and light having passed through a concave lens is dispersed.

The oval convex lens 16' shown in FIG. 6A is a convex lens, for example, in which the curvature in the P'-axis direction is greater than the curvature in the Q'-axis direction perpendicular to the P'-axis direction. Alternatively, a convex lens in which the curvature in the Q'-axis direction is greater than the curvature in the P'-axis direction may be employed.

The oval concave lens 16'' shown in FIG. 6B is a concave lens, for example, in which the curvature in the P''-axis direction is greater than the curvature in the Q''-axis direction perpendicular to the P''-axis direction. Alternatively, a concave lens in which the curvature in the Q''-axis direction is greater than the curvature in the P''-axis direction may be employed.

For the first lens 13 and the second lens 15 in the light source device of the present disclosure, any appropriate combination of a cylindrical lens, a convex lens, and/or a concave lens may be used. This allows light emitted from the light source device to have various aspect ratio values between the major axis and the minor axis direction, and to be collimated, diverged or converged in each of the major axis and the minor axis direction. Examples thereof are shown below First Variation A first variant example of the present disclosure will be described below, in which an oval convex lens 16' is used in place of the second lens 15 in the light source device 1 according to the first embodiment.

The oval convex lens 16' is disposed such that the P'-axis extends in the y-axis direction, and the Q'-axis perpendicular to the P'-axis extends in the x-axis direction. The curvature in the P'-axis direction is greater than the curvature in the Q'-axis direction.

With this structure, light emitted from the laser light source 8 and reflected at the reflecting surface 12a is collimated by the first cylindrical lens 14 in the major axis direction of the light, and passes through the cover 10 while maintaining a constant width in the major axis direction of the light and spreading in the minor axis direction of the light. The light having passed through the cover 10 is incident on and converged by the oval convex lens 16'. With the curvature in the P'-axis direction (the y-axis direction) of the oval convex lens 16' greater than the curvature in the Q'-axis direction (the x-axis direction), the convergence of the light in the minor axis direction is greater than the convergence in the major axis direction (the x-axis direction).

Thus, using a convex lens also allows for obtaining a desired aspect ratio between the major axis direction and the minor axis direction of light emitted from the light source device 1. Furthermore, when an oval convex lens 16' is employed as in the first variant example, light emitted from the light source device 1 is converged. This allows for adjusting a size of an illuminated region according to the distance between the light source device 1 and the target illuminated region.

Second Variation

Next, a second variant example of the present disclosure will be described, in which an oval concave lens 16'' is used in place of the second lens in the light source device 1 according to the first embodiment.

The oval concave lens 16'' is disposed such that the P''-axis of the oval concave lens 16'' extends in the y-axis direction, and the Q''-axis of the oval concave lens 16'' perpendicular to the P''-axis extends in the x-axis direction. The curvature in the P''-axis direction is greater than the curvature in the Q''-axis direction.

With this structure, light emitted from the laser light source 8 and reflected at the reflecting surface 12a is collimated by the first cylindrical lens 14 in a major axis direction of the light, and passes through the cover 10 while maintaining a constant width in the major axis direction of the light and spreading in the minor axis direction of the light. The light having passed through the cover 10 is incident on and diverged by the oval concave lens 16''. With the curvature in the P''-axis direction (the y-axis direction) of the oval concave lens 16'' greater than the curvature in the Q''-axis direction (the x-axis direction), the divergence of the light in the minor axis direction is greater than the divergence in the major axis direction.

Accordingly, using a concave lens also allows for obtaining a desired aspect ratio between the major axis direction and the minor axis direction of light emitted from the light source device. Furthermore, when an oval concave lens 16'' is employed as in the second variant example, light emitted from the light source device 1 is diverged. This allows for adjusting the size of an illuminated region according to the distance between the light source device 1 and the target illuminated region.

Method of Manufacturing

Figure 7A:
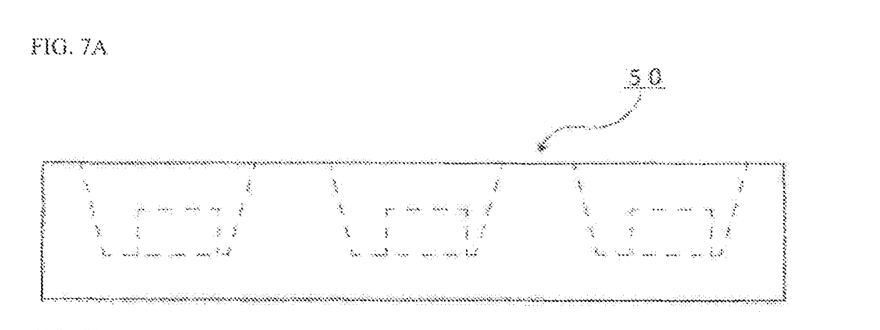
FIG. 7A schematically shows a first step in an exemplary procedure of manufacturing the light source device according to certain embodiments.
Figure 7B:
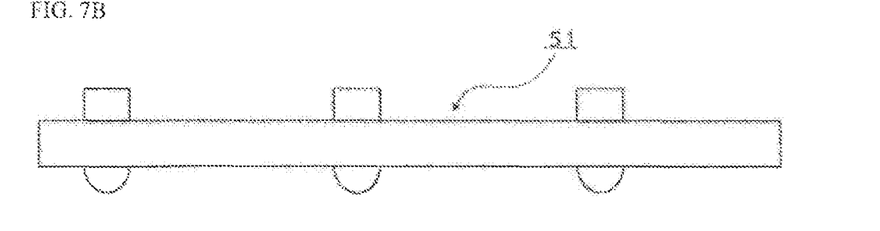
FIG. 7B schematically shows a second step in the exemplary procedure of manufacturing the light source device according to certain embodiments.
Figure 7C:
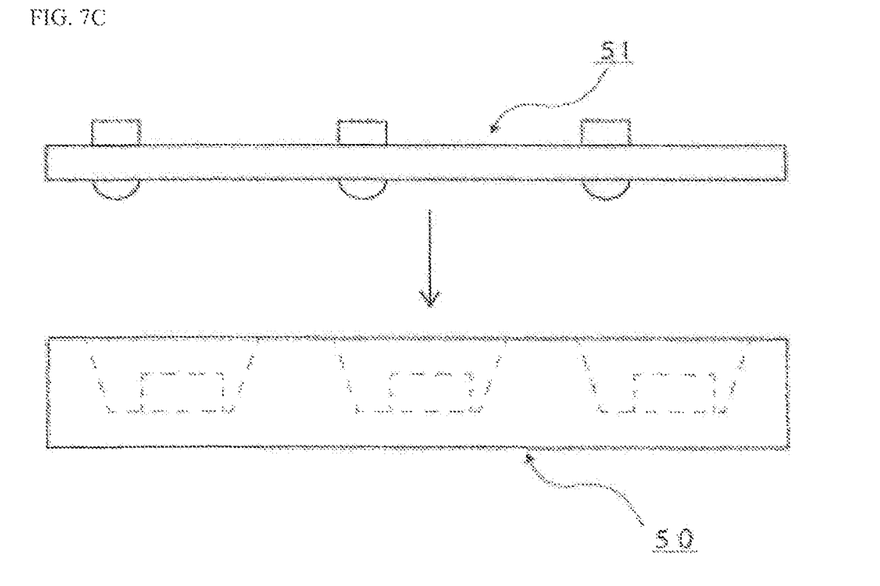
FIG. 7C schematically shows a third step in the exemplary procedure of manufacturing the light source device according to certain embodiments.
Figure 7D:
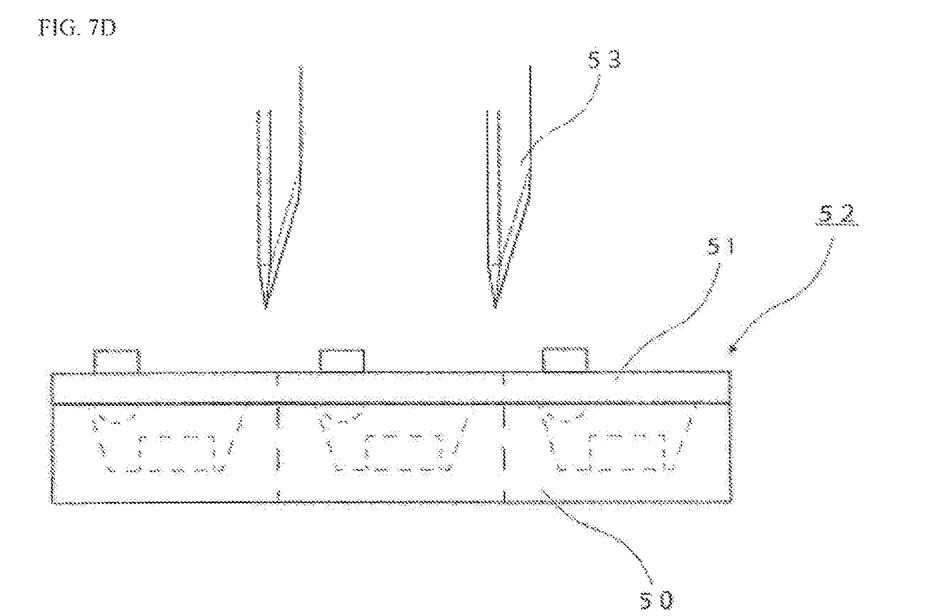
FIG. 7D schematically shows a fourth step in the exemplary procedure of manufacturing the light source device according to certain embodiments.
Figure 7E:
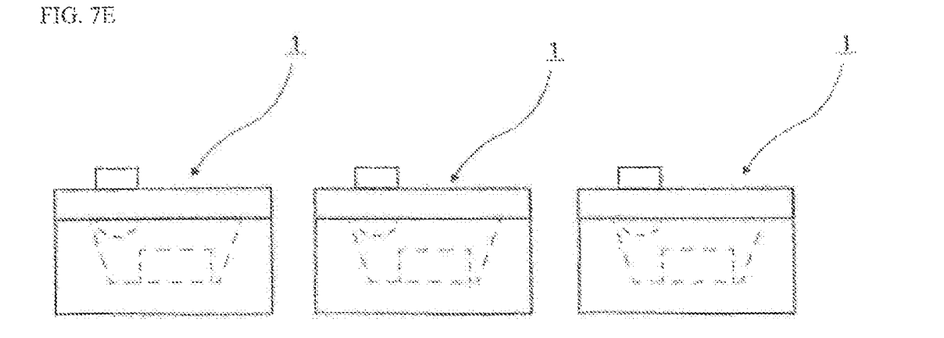
FIG. 7E schematically shows a fourth step in the exemplary procedure of manufacturing the light source device according to the embodiment.

Next, with reference to FIGS. 7A to 7E, a method of manufacturing the light source device of the present disclosure will be described. FIGS. 7A to 7E schematically show an example of a method of manufacturing the light source device of the present disclosure. FIG. 7A shows a step of providing a collective package (hereinafter may be referred to as a "first step"). FIG. 7B shows a step of providing a collective package (hereinafter may be referred to as a "second step"). FIG. 7C shows a step of bonding the collective package and the collective cover together (hereinafter may be referred to as a "third step"). FIGS. 7D and 7E show a step of singulating the collective package and the collective cover into individual light source devices (hereinafter may be referred to as a "fourth step"). The first to fourth steps may be performed in any appropriate order.

As shown in FIG. 7A, a collective package 50 including portions corresponding to a plurality of packages 6 each including a laser light source 8 is provided (first step). When the substrate and the lateral wall member are different members, a collective substrate, which includes a plurality of portions corresponding to substrates, and a collective lateral wall member, which includes a plurality of portions corresponding to lateral wall members, are bonded together; and each of the laser light sources 8 is mounted on a respective one of the recesses defined by the collective substrate and the collective lateral wall member, so that the collective package 50 can be formed. On the other hand, when the substrate and the lateral wall member are integrally molded, for example, each of the laser light source 8 is mounted on a respective one of the recesses defined in a ceramic molded body, so that the collective package 50 can be formed. Alternatively, the collective package 50 may be formed by holding a lead frame including portions corresponding to a plurality of leads corresponding to a plurality of packages with a mold, flowing a resin into a mold to obtain a resin molded body, and mounting the laser light source 8 on each of recesses defined by the lead frames and the resin molded body. As in the fourth embodiment, also when manufacturing a light source device in which a plurality of laser light sources 8 is disposed in one package 6, in the first step, a plurality of corresponding laser light sources 8 is mounted in each of the recesses.

Next, as shown in FIG. 7B, a collective cover 51 including a plurality of covers 10 each including the first lens 13 and the second lens 15 is provided (second step). When the first lens 13, the second lens 15, and the cover 10 are different members, the first lenses 13 and the second lenses 15 are bonded to a collective body including portions corresponding to a plurality of covers, so that the collective cover 51 is formed. When the first lens 13, the second lens 15, and the cover 10 are integrally molded, for example, the collective cover 51 is formed by flowing a melted glass material into a mold.

Next, as shown in FIG. 7C, the collective package 50 and the collective cover 51 are bonded together (third step). The collective package 50 and the collective cover 51 are bonded in a manner similar to the case where the light source devices are individually manufactured. For example, a connecting member made of aluminum or aluminum alloy is formed using sputtering or vapor deposition on a region of the upper surface of each lateral wall member on which the dielectric film is not disposed; and the lower surface of the collective cover is bonded to the upper surface of the connecting member using anodic bonding.

Then, as shown in FIGS. 7D and 7E, the collective package 50 and the collective cover 51 that are bonded together in the third step are divided into multiple individual light source devices (fourth step). As an example of such dividing, FIG. 7D shows a dicing technique in which the collective package 50 is singulated using a blade 53. The dividing may be performed using any appropriate known technique, such as sawing, punching, or laser cutting.

Thus, the collective package 50 and the collective cover 51 are separately manufactured, and then bonded together to obtain a collective light source device 52, after which the collective light source device 52 is divided into multiple individual light source devices. This allows mass production of light source devices.

When the second lens 15 is made of resin, in the manufacturing method described above, a step of providing the collective cover 51 including portions corresponding to a plurality of covers 10 each including the first lens 13 may be performed in place of the second step; and, after the third step, a step of disposing the second lens 15 made of resin at a predetermined position in the collective light source device 52 may be performed.

Through this manufacturing method, the second lens 15 is easily positioned. More specifically, for example, with the laser light source 8 being turned on, the arrangement position of the second lens 15 can be adjusted with reference to light emitted from the laser light source 8. Thus, the second lens 15 is bonded to the cover 10 with high precision. Alternatively, with the laser light source 8 being turned on, the second lens 15 may be formed using a laser abrasion, a 3D printer, or the like with reference to the light emitted from the laser light source 8, which allows for improving the arrangement accuracy of the second lens 15.

While certain embodiments of the present invention are described above, the details regarding structure described in the present disclosure may be changed. The elements in the embodiments described above may be combined and the order of the steps may be changed without deviating from the scope and gist of the present invention.

The invention claimed is:

1. A light source device comprising:
    a package having an upward-facing surface and an inner lateral surface surrounding the upward-facing surface, the package defining a recess defined by the upward-facing surface and the inner lateral surface;
    a laser light source disposed on the upward-facing surface of the package;
    a cover disposed above the package such that the cover closes the recess;
    a reflecting surface reflecting, toward the cover, light emitted from the laser light source;
    a first lens disposed in an optical path region of light reflected at the reflecting surface and on an inner surface side of the cover; and
    a second lens disposed in the optical path region of the light reflected at the reflecting surface and on an outer surface side of the cover, wherein
    one of the first lens and the second lens has a greater curvature in a major axis direction of a far field pattern of light emitted from the laser light source than a curvature in a minor axis direction of the far field pattern, and
    the other one of the first lens and the second lens has a greater curvature in the minor axis direction of the far field pattern of the light emitted from the laser light source than a curvature in the major axis direction of the far field pattern.

2. The light source device according to claim 1, wherein the first lens and the second lens are configured to collimate light spreading in the major axis direction and the minor axis direction into substantially parallel light.

3. The light source device according to claim 1, wherein
    the first lens has a greater curvature in the major axis direction of the far field pattern of the light emitted from the laser light source than in the minor axis direction of the far field pattern of the light emitted from the laser light source, and
    the second lens has a greater curvature in the minor axis direction of the far field pattern of the light emitted from the laser light source than in the major axis direction of the far field pattern of the light emitted from the laser light source.

4. The light source device according to claim 1, wherein the second lens is disposed in a recess provided on the outer surface side of the cover.

5. The light source device according to claim 1, wherein the second lens is disposed on a projection provided on the outer surface side of the cover.

6. The light source device according to claim 1, wherein the first lens is made of glass and the second lens is made of resin.

7. A light source device comprising:
a package having an upward-facing surface and an inner lateral surface surrounding the upward-facing surface, the package defining a recess defined by the upward-facing surface and the inner lateral surface;
a plurality of laser light sources disposed on the upward-facing surface of the package and configured to emit light of different wavelength regions;
a cover disposed above the package such that the cover closes the recess;
a reflecting surface reflecting, toward the cover, light emitted from the plurality of laser light sources;
a plurality of first lenses disposed in the optical path region of the light reflected at the reflecting surface and on an inner surface side of the cover, each of the first lenses corresponding to a respective one of the laser light sources and having a curvature corresponding to a respective wavelength region, and
a plurality of second lenses each of which is disposed in the optical path region of the light reflected at the reflecting surface and on an outer surface side of the cover at a position corresponding to one of the first lenses, each of the second lenses corresponding to the same one of the laser light sources as the corresponding first lens, each of the second lenses having a curvature corresponding to a respective wavelength region, wherein
the plurality of the first lenses and the plurality of the second lenses are disposed on the cover.

8. The light source device according to claim 7, wherein the plurality of the laser light sources are configured to emit light of a wavelength in a red wavelength region, light of a wavelength in a green wavelength region, and light of a wavelength in a blue wavelength region.

9. The light source device according to claim 1, wherein each of the first lens and the second lens is a cylindrical lens.

10. A method of manufacturing the light source device according to claim 1, comprising:
providing a collective package including portions corresponding to a plurality of packages each provided with a respective one of the laser light sources;
providing a collective cover including portions corresponding to a plurality of the covers each including the first lens and the second lens;
bonding the collective package and the collective cover together; and
dividing, into individual ones of the light source devices, the collective package and the collective cover that are bonded together in the bonding the collective package and the collective cover.

11. The method of manufacturing the light source device according to claim 10, wherein the step of providing the collective package includes mounting the plurality of laser light sources.

12. The light source device according to claim 2, wherein the first lens is made of glass and the second lens is made of resin.

13. The light source device according to claim 3, wherein the first lens is made of glass and the second lens is made of resin.

14. The light source device according to claim 4, wherein the first lens is made of glass and the second lens is made of resin.

15. The light source device according to claim 5, wherein the first lens is made of glass and the second lens is made of resin.

16. A method of manufacturing the light source device according to claim 2, comprising:
providing a collective package including portions corresponding to a plurality of packages each provided with a respective one of the laser light sources;
providing a collective cover including portions corresponding to a plurality of the covers each including the first lens and the second lens;
bonding the collective package and the collective cover together; and
dividing, into individual ones of the light source devices, the collective package and the collective cover that are bonded together in the bonding the collective package and the collective cover.

17. A method of manufacturing the light source device according to claim 3, comprising:
providing a collective package including portions corresponding to a plurality of packages each provided with a respective one of the laser light sources;
providing a collective cover including portions corresponding to a plurality of the covers each including the first lens and the second lens;
bonding the collective package and the collective cover together; and
dividing, into individual ones of the light source devices, the collective package and the collective cover that are bonded together in the bonding the collective package and the collective cover.

18. A method of manufacturing the light source device according to claim 4, comprising:
providing a collective package including portions corresponding to a plurality of packages each provided with a respective one of the laser light sources;
providing a collective cover including portions corresponding to a plurality of the covers each including the first lens and the second lens;
bonding the collective package and the collective cover together; and
dividing, into individual ones of the light source devices, the collective package and the collective cover that are bonded together in the bonding the collective package and the collective cover.

19. A method of manufacturing the light source device according to claim 5, comprising:
providing a collective package including portions corresponding to a plurality of packages each provided with a respective one of the laser light sources;
providing a collective cover including portions corresponding to a plurality of the covers each including the first lens and the second lens;
bonding the collective package and the collective cover together; and
dividing, into individual ones of the light source devices, the collective package and the collective cover that are bonded together in the bonding the collective package and the collective cover.

20. A method of manufacturing the light source device according to claim 6, comprising:

providing a collective package including portions corresponding to a plurality of packages each provided with a respective one of the laser light sources;
providing a collective cover including portions corresponding to a plurality of the covers each including the first lens and the second lens;
bonding the collective package and the collective cover together; and
dividing, into individual ones of the light source devices, the collective package and the collective cover that are bonded together in the bonding the collective package and the collective cover.

\* \* \* \* \*